US012587241B2

(12) United States Patent
Hong et al.

(10) Patent No.: US 12,587,241 B2
(45) Date of Patent: Mar. 24, 2026

(54) SIGNAL DETECTION CIRCUIT AND DETECTION METHOD USING THE SAME

(71) Applicant: POSTECH RESEARCH AND BUSINESS DEVELOPMENT FOUNDATION, Pohang-si (KR)

(72) Inventors: Won Bin Hong, Pohang-si (KR); Dong Geun An, Pohang-si (KR); Su Ho Chang, Pohang-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 0 days.

(21) Appl. No.: 18/738,608

(22) Filed: Jun. 10, 2024

(65) Prior Publication Data

US 2025/0300699 A1 Sep. 25, 2025

(30) Foreign Application Priority Data

Mar. 20, 2024 (KR) ........................ 10-2024-0038582

(51) Int. Cl.
*H04B 7/0413* (2017.01)
*H04B 7/04* (2017.01)
*H04B 7/155* (2006.01)

(52) U.S. Cl.
CPC ....... *H04B 7/0413* (2013.01); *H04B 7/04013* (2023.05); *H04B 7/15528* (2013.01)

(58) Field of Classification Search
CPC .............. H04B 7/04013; H04B 7/0413; H04B 7/15528
See application file for complete search history.

(56) References Cited

U.S. PATENT DOCUMENTS

| | | | |
|---|---|---|---|
| 2021/0384958 A1 | 12/2021 | Denis et al. | |
| 2023/0129420 A1 | 4/2023 | Yun et al. | |
| 2023/0189021 A1* | 6/2023 | Ali ........................ | H04W 24/02 370/252 |

FOREIGN PATENT DOCUMENTS

| | | |
|---|---|---|
| CN | 110266352 B | 5/2021 |
| CN | 108267720 B | 8/2021 |

(Continued)

OTHER PUBLICATIONS

Ahmed Al-Hilo et al., "Reconfigurable Intelligent Surface Enabled Vehicular Communication: Joint User Scheduling and Passive Beamforming", IEEE Transactions On Vehicular Technology, Mar. 2022, pp. 2333-2345, vol. 71, No. 3.

(Continued)

*Primary Examiner* — Rahel Guarino
(74) *Attorney, Agent, or Firm* — Sughrue Mion, PLLC

(57) ABSTRACT

Provided are a signal detection circuit and a detection method using the signal detection circuit. The signal detection circuit includes a reconfigurable intelligent surface, a multiple input/output circuit connected to the reconfigurable intelligent surface, a magnitude detection circuit connected to the multiple input/output circuit, and a processor connected to the magnitude detection circuit, wherein the reconfigurable intelligent surface includes a sampling area arranged to intersect in a first direction and a second direction, the multiple input/output circuit is configured to receive and process a signal from the sampling area, the magnitude detection circuit is configured to receive the signal from the multiple input/output circuit and detect a magnitude of the received signal, and the processor is configured to identify an incidence direction of the signal based on a detection result of the magnitude detection circuit.

10 Claims, 20 Drawing Sheets

(56)         References Cited

FOREIGN PATENT DOCUMENTS

| CN | 113067636 B | 6/2022 |
|---|---|---|
| EP | 3439107 A1 | 2/2019 |
| KR | 10-2023-0058197 A | 5/2023 |
| WO | 2022/182264 A1 | 9/2022 |
| WO | 2023/228158 A1 | 11/2023 |

OTHER PUBLICATIONS

Emil Bjornson et al., "Reconfigurable Intelligent Surfaces: A signal processing perspective with wireless applications", Wireless Future Blog, Jun. 8, 2020, pp. 1-10.

Baihua Shi et al., "DOA Estimation for Hybrid Massive MIMO Systems using Mixed-ADCs: Performance Loss and Energy Efficiency", IEEE, May 20, 2023, pp. 1-12.

Dong-Woo Kim et al., "Implementation of a Three-Dimensional Analog Beamforming System Using Stacked Rotman Lenses at 28 GHz", The Journal of Korean Institute of Electromagnetic Engineering and Science, Nov. 2021, pp. 943-950, vol. 32, No. 11.

Vishwanath Natarajan et al., "Built-in Test Enabled Diagnosis and Tuning of RF Transmitter Systems", VLSI Design, 2008, pp. 11, vol. 2008.

Idban Alamzadeh et al., "A reconfigurable intelligent surface with integrated sensing capability", Scientific Reports, 2021, pp. 1-10, vol. 11.

P A Turalchuk, "Direction of Arrival Estimation for Retrodirective Rotman Lens Antenna Array", Journal of Physics : Conference Series, 2018, pp. 5, vol. 1092.

Ping-Chieh Chiang et al., "Implementation of direction-of-arrival estimation using Rotman lens array antenna", Proceedings of the "2013 International Symposium on Electromagnetic Theory", 2013, pp. 855-858.

Tianyu Lan et al., "DOA Estimation Algorithm for Reconfigurable Intelligent Surface Co-Prime Linear Array Based on Multiple Signal Classification Approach", MDPI Information, 2022, pp. 1-13, vol. 13, No. 72.

Ahmed Elzanaty et al., "Reconfigurable Intelligent Surfaces for Localization: Position and Orientation Error Bounds", IEEE Transactions on Signal Processing, 2021, pp. 5386-5402, vol. 69.

Sean Victo Hum et al., "Modeling and Design of Electronically Tunable Reflectarrays", Aug. 2007, pp. 2200-2210, vol. 55, No. 8.

Mezghani, et al., "Nonlocal Reconfigurable Intelligent Surfaces for Wireless Communication: Modeling and Physical Layer Aspects", arXiv:2210.05928v1 [cs.IT], Oct. 12, 2022, pp. 1-12 (12 pages).

Extended European Search Report dated Nov. 6, 2024 in Application No. 24177472.8.

* cited by examiner

FIG. 17

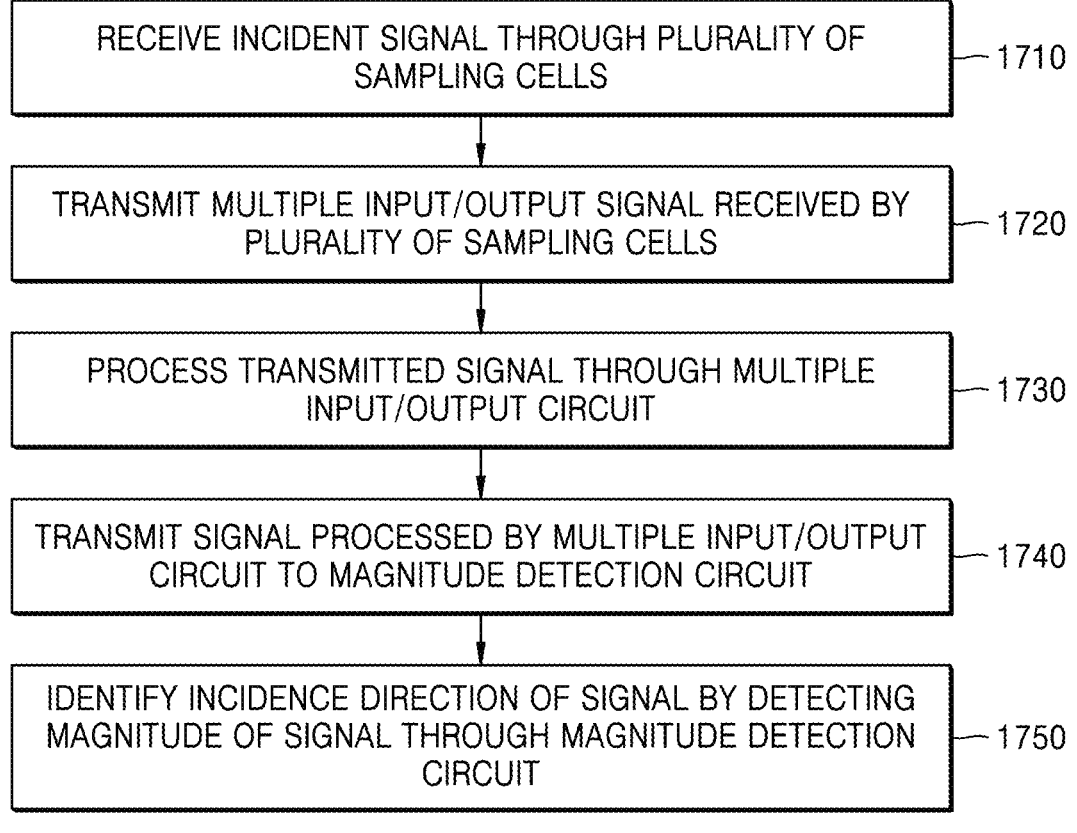

RECEIVE INCIDENT SIGNAL THROUGH PLURALITY OF SAMPLING CELLS ——1710

TRANSMIT MULTIPLE INPUT/OUTPUT SIGNAL RECEIVED BY PLURALITY OF SAMPLING CELLS ——1720

PROCESS TRANSMITTED SIGNAL THROUGH MULTIPLE INPUT/OUTPUT CIRCUIT ——1730

TRANSMIT SIGNAL PROCESSED BY MULTIPLE INPUT/OUTPUT CIRCUIT TO MAGNITUDE DETECTION CIRCUIT ——1740

IDENTIFY INCIDENCE DIRECTION OF SIGNAL BY DETECTING MAGNITUDE OF SIGNAL THROUGH MAGNITUDE DETECTION CIRCUIT ——1750

SIGNAL DETECTION CIRCUIT AND DETECTION METHOD USING THE SAME

CROSS-REFERENCE TO RELATED APPLICATION

This application is based on and claims priority under 35 U.S.C. § 119 to Korean Patent Application No. 10-2024-0038582, filed on Mar. 20, 2024, in the Korean Intellectual Property Office, the disclosure of which is incorporated by reference herein in its entirety.

BACKGROUND

1. Field

The disclosure relates to a signal detection circuit and a detection method using the signal detection circuit. In particular, the disclosure relates to a technology for recognizing a surrounding environment by using a reconfigurable intelligent surface and establishing a wireless communication channel in accordance with the surrounding environment.

This research was conducted with the support of Samsung Future Technology Promotion Project (Project No.: SRFC-TE2103-01).

2. Description of the Related Art

Recently, mobile communication has required high reliability and high data transmission rates for services such as virtual/augmented reality and movie downloads. However, in a wireless environment, due to obstacles such as walls, the strength of a signal received from a base station may decrease and the reliability and data transmission rate of a cellular network may decrease rapidly.

In order to overcome this limitation, additional base stations and repeaters are installed as a solution; however, this is inefficient due to high installation costs and restricted installation places. In order to improve the wireless communication performance in a wireless environment, a reconfigurable intelligent surface has attracted attention due to its few restrictions on installation places and low costs.

As a metasurface including elements controllable by software, a reconfigurable intelligent surface may adjust the phase of a reflected radio wave and may form a desired shape of beam by controlling the phase of a reflected wave. In order to form a beam in a desired shape, the reconfigurable intelligent surface may control elements based on the direction of a radio wave incident on the reconfigurable intelligent surface.

Moreover, the manufacturing cost of a circuit used to detect the direction of a radio wave incident on the reconfigurable intelligent surface may be high. In the related art, a radio wave direction detecting method uses a circuit including high-cost elements, such as a radio frequency (RF) chain circuit. Accordingly, there is a need to reduce the manufacturing cost of the circuit by using lower-cost elements to implement the circuit for detecting the direction of a radio wave incident on the reconfigurable intelligent surface.

SUMMARY

Additional aspects will be set forth in part in the description which follows and, in part, will be apparent from the description, or may be learned by practice of the presented embodiments of the disclosure.

According to an aspect of the disclosure, a signal detection circuit includes a reconfigurable intelligent surface, a multiple input/output circuit connected to the reconfigurable intelligent surface, a magnitude detection circuit connected to the multiple input/output circuit, and a processor connected to the magnitude detection circuit, wherein the reconfigurable intelligent surface includes a sampling area arranged to intersect in a first direction and a second direction, the multiple input/output circuit is configured to receive and process a signal from the sampling area, the magnitude detection circuit is configured to receive the signal from the multiple input/output circuit and detect a magnitude of the received signal, and the processor is configured to identify an incidence direction of the signal based on a detection result of the magnitude detection circuit.

According to another aspect of the disclosure, a detection method using a signal detection circuit includes receiving an incident signal through a plurality of sampling cells, transmitting the signal received by the plurality of sampling cells to a multiple input/output circuit, processing the transmitted signal through the multiple input/output circuit, transmitting the signal processed by the multiple input/output circuit to a magnitude detection circuit, and identifying an incidence direction of the signal by detecting a magnitude of the signal through the magnitude detection circuit.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 is a diagram illustrating a detection method using a signal detection circuit according to an embodiment;

DETAILED DESCRIPTION

Figure 1:
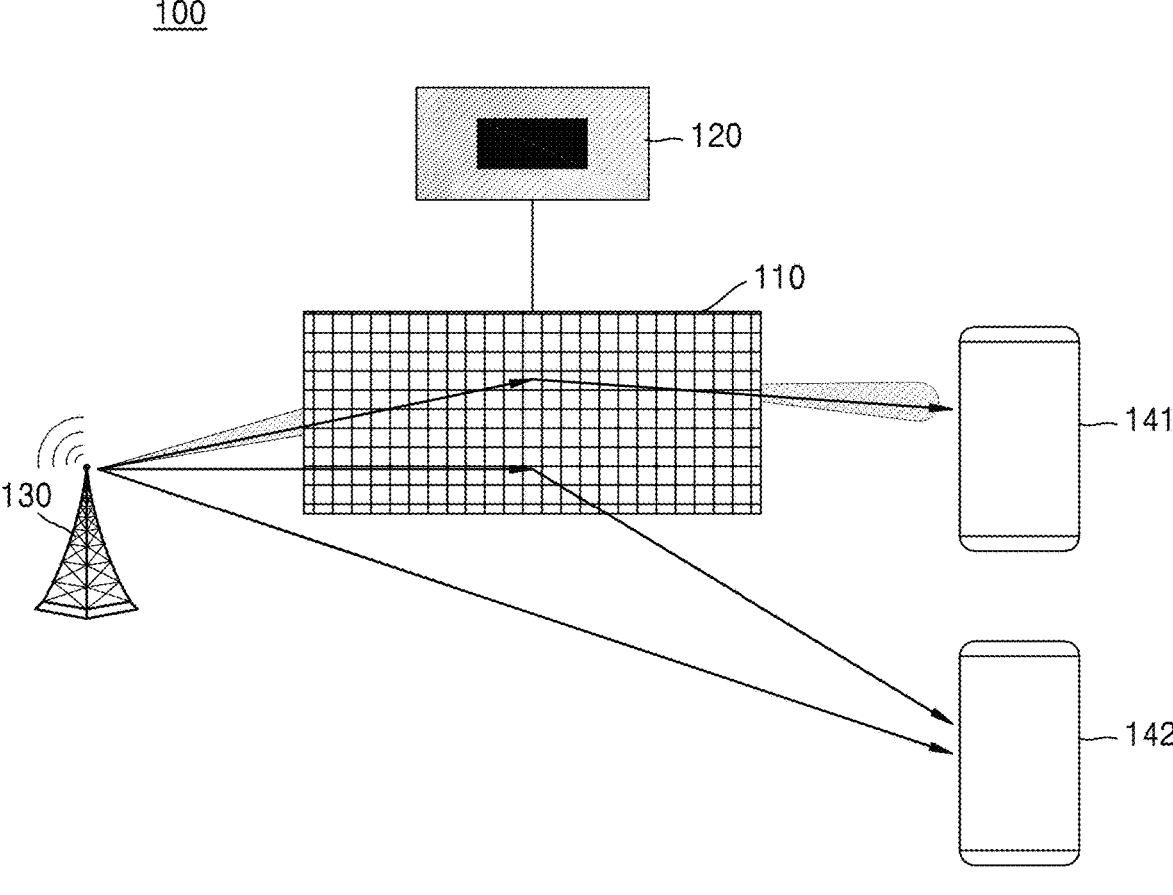
FIG. 1 is a diagram illustrating a communication system including a reconfigurable intelligent surface (RIS) according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following description of embodiments should not be construed as limiting the scope of the disclosure, and those that may be easily inferred by those of ordinary skill in the art should be construed as being included in the scope of the embodiments. Hereinafter, embodiments will be described in detail merely as examples with reference to the accompanying drawings.

Hereinafter, embodiments will be described in detail with reference to the accompanying drawings. Like reference numerals in the drawings will denote like elements, and sizes of elements in the drawings may be exaggerated for clarity and convenience of description. The embodiments described below are merely examples, and various modifications may be made therein.

As used herein, the terms "over" or "on" may include not only "directly over" or "directly on" but also "indirectly over" or "indirectly on". As used herein, the singular forms "a", "an", and "the" may include the plural forms as well, unless the context clearly indicates otherwise. Also, when something is referred to as "including" a component, another component may be further included unless specified otherwise.

The use of the terms "a", "an", and "the" and other similar indicative terms may be construed to cover both the singular and the plural. Unless there is an explicit order or a contrary description, operations constituting a method may be performed in a suitable order and are not necessarily limited to the described order.

Also, as used herein, the terms "units" and "modules" may refer to units that perform at least one function or operation, and the units may be implemented as hardware or software or a combination of hardware and software.

Connections or connection members of lines between the elements illustrated in the drawings may illustratively represent functional connections and/or physical or logical connections and may be represented as various replaceable or additional functional connections, physical connections, or logical connections in an actual apparatus.

Expressions such as "at least one of," when preceding a list of elements, modify the entire list of elements and do not modify the individual elements of the list. For example, an expression such as "at least one of A, B, and C" or "at least one selected from the group consisting of A, B, and C" may be interpreted as only A, only B, only C, or any combination of two or more of A, B, and C, such as A, B, and C, A and B, B and C, and A and C.

When the term "about" or "substantially" is used in relation to a numerical value, the numerical value may be interpreted as including manufacturing or operating deviations (e.g., ±10%) around the numerical value. Also, when the term "generally" or "substantially" is used in relation to a geometric shape, it may be intended that a geometric accuracy is not required and a tolerance of the shape is within the scope of the present embodiments. Also, regardless of whether a numerical value or a shape is modified by the term "about" or "substantially," the numerical value or the shape may be interpreted as including manufacturing or operating deviations (e.g., ±10%) around the numerical value or the shape.

Although terms such as "first" and "second" may be used herein to describe various elements or components, these elements or components should not be limited by these terms. These terms are only used to distinguish one element or component from another element or component.

All examples or illustrative terms used herein are merely intended to describe the technical concept of the disclosure in detail, and the scope of the disclosure is not limited by these examples or illustrative terms unless otherwise defined in the appended claims.

Hereinafter, embodiments will be described in detail merely as examples with reference to the accompanying drawings.

FIG. 1 is a diagram illustrating a communication system 100 including a reconfigurable intelligent surface (RIS) 110 according to an embodiment. The communication system 100 according to an embodiment may include the RIS 110, a processor 120, a transmitter 130, and at least one receiver 141 and/or 142.

The RIS 110 may receive a signal from the transmitter 130. Under the control by the processor 120, the RIS 110 may reconfigure a propagation surface of the RIS 110 based on the occurrence of an event of receiving a signal.

The RIS 110 may steer an incident wave in a particular direction. The wave steered by the RIS 110 according to an embodiment may be an electromagnetic wave in a radio frequency band. For example, the RIS 110 may steer a radio signal in a millimeter wave (hereinafter referred to as 'mmWave') band. For example, the millimeter waves may include 5G signals.

By using the propagation surface, the RIS 110 may reflect and transmit the received signal to the at least one receiver 141 and/or 142. For example, the RIS 110 may reflect the received signal to a first receiver 141 to establish a wireless communication channel with the first receiver 141. For example, the RIS 110 may reflect the received signal to a second receiver 142 to establish a wireless communication channel, like the signal directly transmitted to the transmitter 130 and the second receiver 142.

The RIS 110 may obtain position information of the transmitter 130 and the at least one receiver 141 and/or 142 in order to transmit a signal to the at least one receiver 141 and/or 142. When failing to obtain the position information of the transmitter 130 and the at least one receiver 141 and/or 142, the RIS 110 may establish a wireless communication channel with certain characteristics. For example, when failing to recognize the position information of the transmitter 130 and the at least one receiver 141 and/or 142, the RIS 110 may establish a wireless communication channel with a fixed form.

The RIS 110 may detect or recognize the position information of the transmitter 130 and the at least one receiver 141 and/or 142. Under the control by the processor 120, the RIS 110 may reconfigure the propagation surface of the RIS 110 based on the position information of the transmitter 130 and the at least one receiver 141 and/or 142. Based on the reconfigured propagation surface, the RIS 110 may steer a beam incident from the transmitter 130 toward the at least one receiver 141 and/or 142. When the RIS 110 has a function of recognizing the position information of the transmitter 130 and the at least one receiver 141 and/or 142, the beam incident from the transmitter 130 may be adaptively steered in accordance with the position of the at least one receiver 141 and/or 142.

Figure 2:
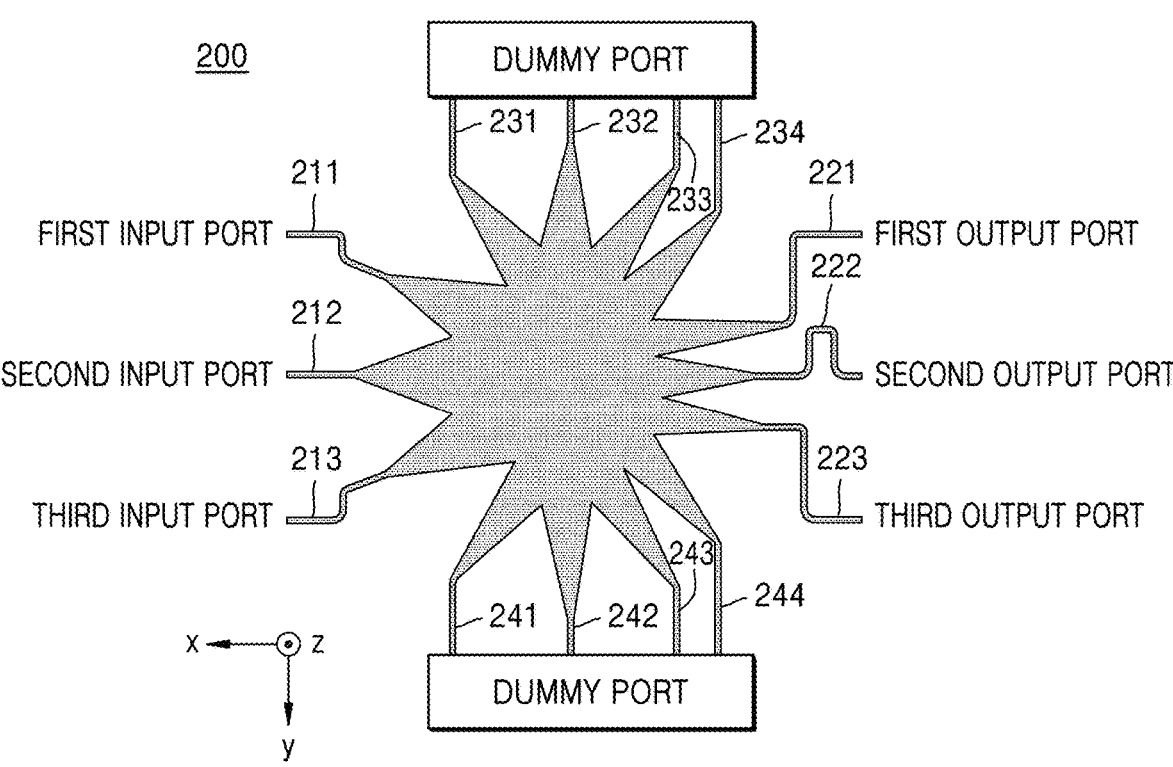
FIG. 2 is a diagram illustrating a multiple input/output circuit according to an embodiment.

FIG. 2 is a diagram illustrating a multiple input/output circuit 200 according to an embodiment.

The multiple input/output circuit 200 may be a circuit through which a plurality of signals may be input and output. The multiple input/output circuit 200 may include a plurality of ports for inputting and outputting a plurality of signals. The multiple input/output circuit 200 may be implemented by using various circuits or lenses. FIG. 2 illustrates implementing the multiple input/output circuit 200 by using a Rotman Lens. In FIGS. 3 to 10, it is assumed that the multiple input/output circuit 200 is implemented by using a Rotman lens. However, the disclosure is not limited thereto, and examples of implementing the multiple input/output circuit 200 by using a circuit or lens are additionally illustrated in FIGS. 11 to 16.

The multiple input/output circuit 200 according to an embodiment may include a plurality of input ports 211, 212, and 213, a plurality of output ports 221, 222, and 223, and a plurality of dummy ports 231, 232, 233, 234, 241, 242, 243, and 244. For example, the multiple input/output circuit 200 may include a first input port 211, a second input port 212, a third input port 213, a first output port 221, a second output port 222, a third output port 223, and eight dummy ports 231, 232, 233, 234, 241, 242, 243, and 244. However, the disclosure is not limited thereto, and the number of input ports, the number of output ports, and the number of dummy ports of the multiple input/output circuit 200 may be variable.

The multiple input/output circuit 200 may include a transmission line or waveguide structure arranged between the plurality of input ports 211, 212, and 213 and the plurality of output ports 221, 222, and 223. The multiple input/output circuit 200 may output signals input to the plurality of input ports 211, 212, and 213, from the plurality of output ports 221, 222, and 223. The multiple input/output circuit 200 may adjust the phase of signals output from the plurality of output ports 221, 222, and 223 by using the transmission line or the waveguide structure.

The multiple input/output circuit 200 may be included in a beamformer. The beamformer may independently control the phase and amplitude of signals in the transmission path and reception path of each of a plurality of channels. The beamformer may electrically adjust a beam of a transmitted signal to optimally transmit a signal. The multiple input/ output circuit 200 may be used in a broadband communication device that provides multiple data channels.

Figure 3:
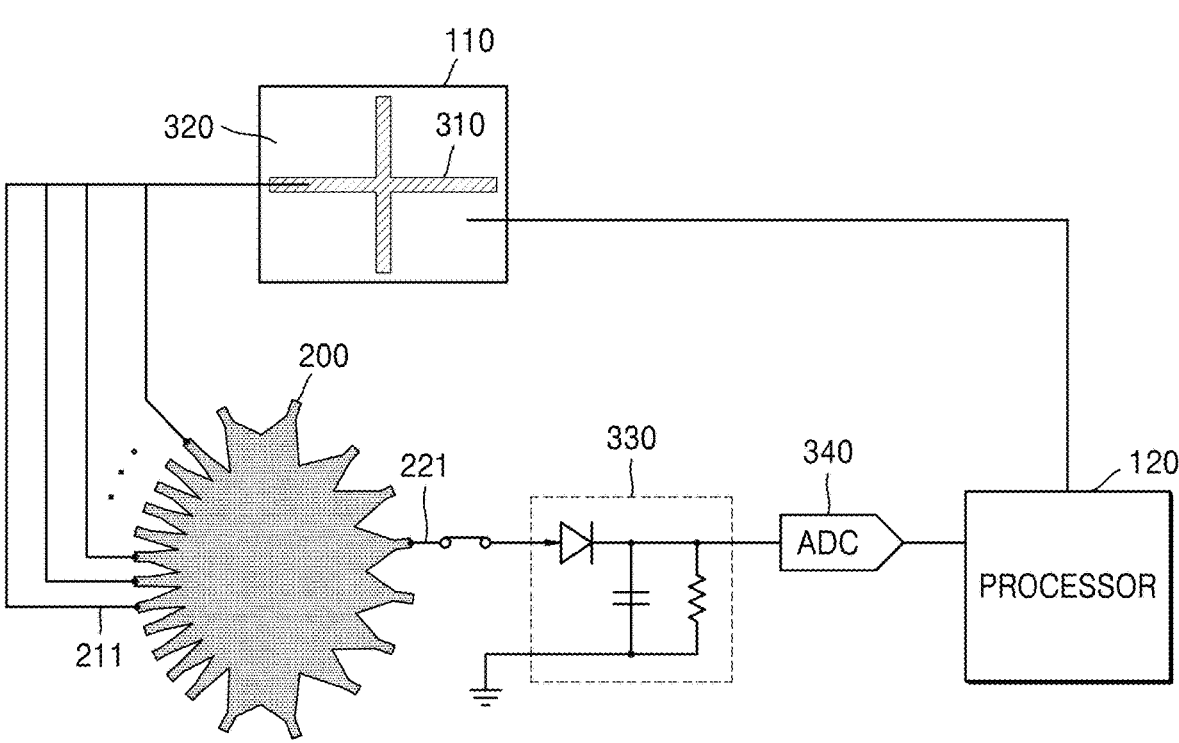
FIG. 3 is a diagram illustrating a signal detection circuit including a reconfigurable intelligent surface according to an embodiment.

FIG. 3 is a diagram illustrating a signal detection circuit including an RIS 110 according to an embodiment. The signal detection circuit may include an RIS 110, a multiple input/output circuit 200, and a magnitude detection circuit 330.

The RIS 110 may include a sampling area 310 and a reflection area 320. Each of the sampling area 310 and the reflection area 320 may include a plurality of unit cells. A plurality of unit cells constituting the sampling area 310 may be arranged to intersect in a first direction and a second direction. For example, the plurality of unit cells constituting the sampling area 310 may be arranged to intersect in an X-axis direction (row direction) and a Y-axis direction (column direction). The second direction may be perpendicular to the first direction. However, the disclosure is not limited thereto, and the second direction may be a direction intersecting the first direction while not being perpendicular to the first direction. A plurality of unit cells constituting the reflection area 320 may be arranged in an area other than an area in which the plurality of unit cells constituting the sampling area 310 are arranged.

The sampling area 310 may receive a plurality of signals that are incident with different phases. The sampling area 310 may sample at least some of the plurality of signals. The sampling area 310 may transmit the sampled signal to the multiple input/output circuit 200.

The reflection area 320 may receive a plurality of incident signals. The reflection area 320 may reflect a plurality of signals. The reflection area 320 may vary the reception direction of a plurality of signals such that the receiver may receive the signals.

The multiple input/output circuitry 200 may be connected to the sampling area 310 of the RIS 110. The multiple input/output circuit 200 may be connected to the sampling area 310 through the plurality of input ports including the first input port 211. The multiple input/output circuit 200 may receive the sampled signal from the sampling area 310. The multiple input/output circuit 200 may adjust the phase of the received signal.

The multiple input/output circuit 200 may output the phase-adjusted signal through the plurality of output ports including the first output port 221. The plurality of output ports of the multiple input/output circuit 200 may be connected to the magnitude detection circuit 330. The multiple input/output circuit 200 may transmit the phase-adjusted signal to the magnitude detection circuit 330.

The magnitude detection circuit 330 may receive the phase-adjusted signal from the multiple input/output circuit 200. The magnitude detection circuit 330 may detect the amplitude of the received signal. The magnitude detection circuit 330 may detect the magnitude of the received signal. For example, the magnitude detection circuit 330 may be an envelope detector that detects the envelope of the received signal. The envelope of a signal may be a waveform that represents the overall amplitude of the signal. The envelope of the signal may include magnitude information of the signal. The magnitude detection circuit 330 may generate an output voltage based on the amplitude or magnitude of a detected signal. The magnitude detection circuit 330 may transmit the generated output voltage to an analog-to-digital converter (ADC) 340.

The ADC 340 may receive the output voltage from the magnitude detection circuit 330. The ADC 340 may convert the output voltage into a direct current (DC) output voltage. The ADC 340 may transmit the converted output voltage to the processor 120.

The processor 120 may receive the output voltage from the ADC 340. The processor 120 may identify the incidence direction of the signal sampled in the sampling area 310, based on the magnitude of the received output voltage. The processor 120 may generate a control signal for controlling the reflection area 320 based on the identification result.

The processor 120 may be connected to the reflection area 320. The processor 120 may transmit the control signal to the reflection area 320. The processor 120 may control the direction of a plurality of signals reflected from the reflection area 320 by using a control signal.

In the related art, because an RIS 110 uses a radio frequency (RF) chain circuit for communication, the manufacturing cost of a signal detection circuit including the RIS 110 increases. In particular, as the area of the RIS 110 increases, because the number of required RF chain circuits increases, the manufacturing cost of the signal detection circuit including the RIS 110 further increases.

The signal detection circuit including the RIS 110 according to the disclosure may process signals through the multiple input/output circuit 200 and then process the signals by using the magnitude detection circuit 330. Accordingly, the signal detection circuit including the RIS 110 according to the disclosure may reduce the manufacturing cost by reducing the number of required RF circuits. In particular, even when the area of the RIS 110 increases, because the extent to which the sampling area 310 increases is not great, the manufacturing cost of the signal detection circuit including the RIS 110 may be further reduced.

Figure 4:
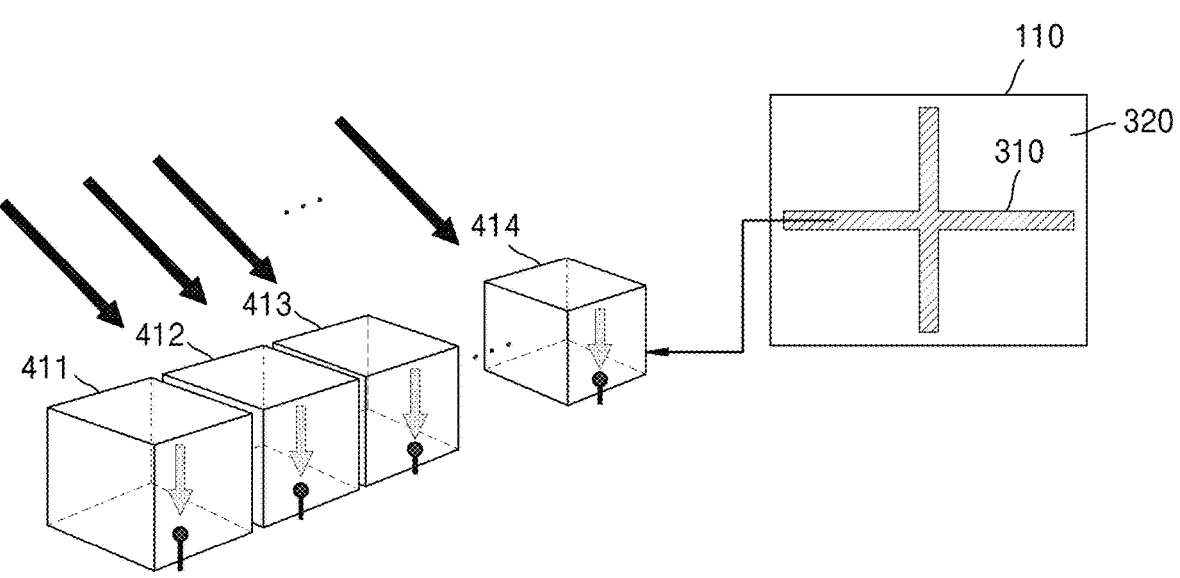
FIG. 4 is a diagram illustrating a plurality of sampling unit cells included in a sampling area of a reconfigurable intelligent surface according to an embodiment.

FIG. 4 is a diagram illustrating a plurality of sampling unit cells 411, 412, 413, and 414 included in a sampling area 310 of an RIS 110 according to an embodiment.

The plurality of sampling unit cells 411, 412, 413, and 414 may be arranged in parallel. For example, the plurality of sampling unit cells 411, 412, 413, and 414 may be arranged horizontally in one line and vertically in one line. Each of the plurality of sampling unit cells 411, 412, 413, and 414 may have a rectangular hexahedron shape or a regular hexahedron shape. The size of each of the plurality of sampling unit cells 411, 412, 413, and 414 may be less than or equal to the half wavelength of the lowest operating frequency.

Each of the plurality of sampling unit cells 411, 412, 413, and 414 may receive a plurality of incident signals. Each of the plurality of sampling unit cells 411, 412, 413, and 414 may sample a plurality of received signals. Each of the plurality of sampling unit cells 411, 412, 413, and 414 may include an output terminal. Each of the plurality of sampling unit cells 411, 412, 413, and 414 may transmit the plurality of received signals to the multiple input/output circuit 200 through the output terminal.

Each of the plurality of sampling unit cells 411, 412, 413, and 414 may be an active cell or a variable cell that receives power while functioning as a reflection unit cell. Each of the plurality of sampling unit cells 411, 412, 413, and 414 may be a passive cell that functions as a general antenna unit cell. When each of the plurality of sampling unit cells 411, 412, 413, and 414 is an active cell or a variable cell, a transmission coefficient when a signal is transmitted from the plurality of sampling unit cells 411, 412, 413, and 414 to the multiple input/output circuit 200 may be designed to be about −20 dB to about 0 dB. When each of the plurality of sampling unit cells 411, 412, 413, and 414 is a passive cell, a transmission coefficient when a signal is transmitted from the plurality of sampling unit cells 411, 412, 413, and 414 to the multiple input/output circuit 200 may be designed to be adjacent to 0 dB.

Figure 5:
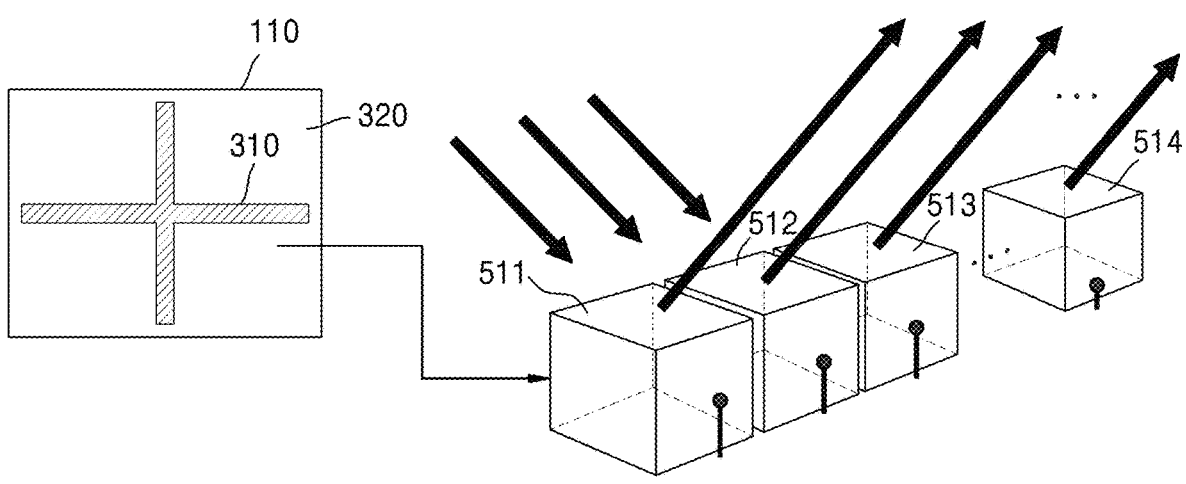
FIG. 5 is a diagram illustrating a plurality of reflection unit cells included in a reflection area of a reconfigurable intelligent surface according to an embodiment.

FIG. 5 is a diagram illustrating a plurality of reflection unit cells 511, 512, 513, and 514 included in a reflection area 320 of an RIS 110 according to an embodiment.

The plurality of reflection unit cells 511, 512, 513, and 514 may be arranged in an area other than an area in which the plurality of sampling unit cells 411, 412, 413, and 414 are arranged. For example, the plurality of reflection unit cells 511, 512, 513, and 514 may be arranged in an area other than a line in which the plurality of sampling unit cells 411, 412, 413, and 414 are arranged. Each of the plurality of reflection unit cells 511, 512, 513, and 514 may have a rectangular hexahedron shape or a regular hexahedron shape.

Each of the plurality of reflection unit cells 511, 512, 513, and 514 may reflect a plurality of incident signals. Each of the plurality of reflection unit cells 511, 512, 513, and 514 may include an input terminal. Each of the plurality of reflection unit cells 511, 512, 513, and 514 may control the direction of an incident signal based on a control signal received through the input terminal. The size of each of the plurality of reflection unit cells 511, 512, 513, and 514 may be less than or equal to the half wavelength of the lowest operating frequency.

When each of the plurality of sampling unit cells 411, 412, 413, and 414 is an active cell or a variable cell, the control signal of each of the plurality of sampling unit cells 411, 412, 413, and 414 may be controlled such that the reflection phase value of each of the plurality of sampling unit cells 411, 412, 413, and 414 is equal to the average phase value of the plurality of reflection unit cells 511, 512, 513, and 514 arranged therearound. Each of the plurality of sampling unit cells 411, 412, 413, and 414 may be designed to maximize the isolation value from the plurality of neighboring reflection unit cells 511, 512, 513, and 514.

Figure 6:
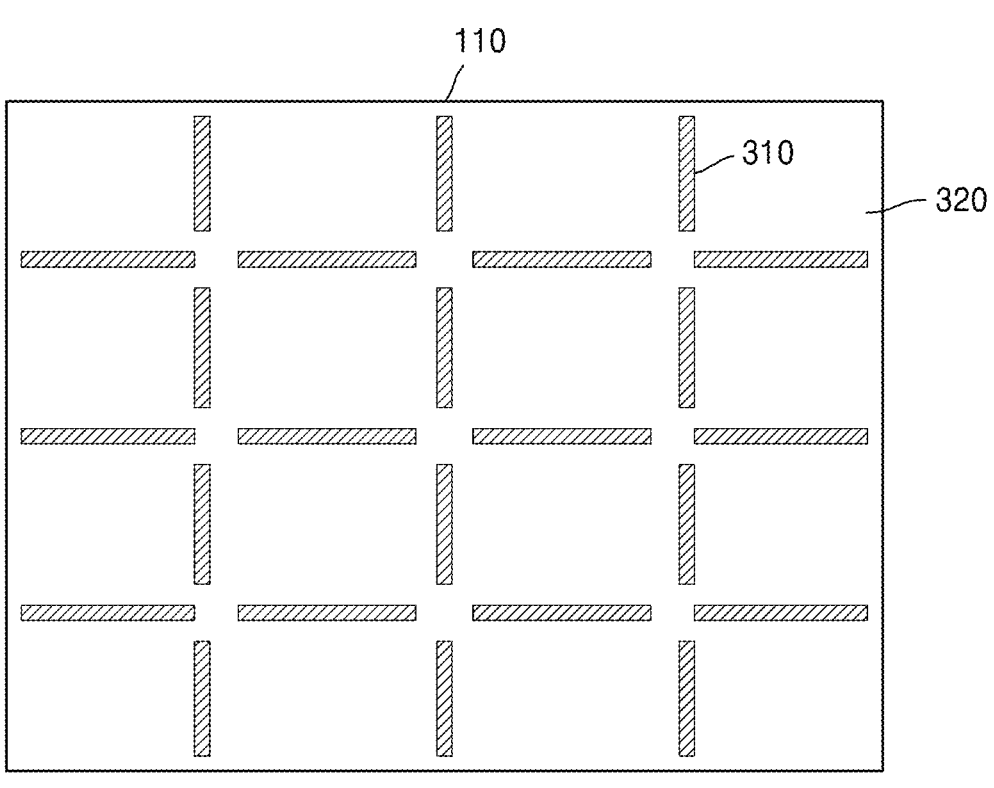
FIG. 6 is a diagram illustrating an arrangement structure of a sampling area and a reflection area of a reconfigurable intelligent surface according to an embodiment.

FIG. 6 is a diagram illustrating an arrangement structure of a sampling area 310 and a reflection area 320 of an RIS 110 according to an embodiment.

The sampling area 310 may be divided into a plurality of portions of the RIS 110. The sampling area 310 may be arranged in parallel in each of the plurality of portions. For example, the sampling area 310 may be arranged in a plurality of lines that are horizontally and vertically divided. A plurality of sampling cells included in the same line may be connected to the same input port of the multiple input/output circuit 200. A plurality of sampling cells included in an adjacent line may be connected to an adjacent input port of the multiple input/output circuit 200.

The reflection area 320 may be formed in an area other than an area in which the sampling area 310 is formed, on the front side of the RIS 110. The reflection area 320 may distinguish a plurality of sampling cells arranged in the sampling area 310 from each other. For example, when the sampling area 310 is arranged in a plurality of lines that are horizontally and vertically divided, the reflection area 320 may be arranged on the front side of the RIS 110 while distinguishing the plurality of lines from each other.

Figure 7:
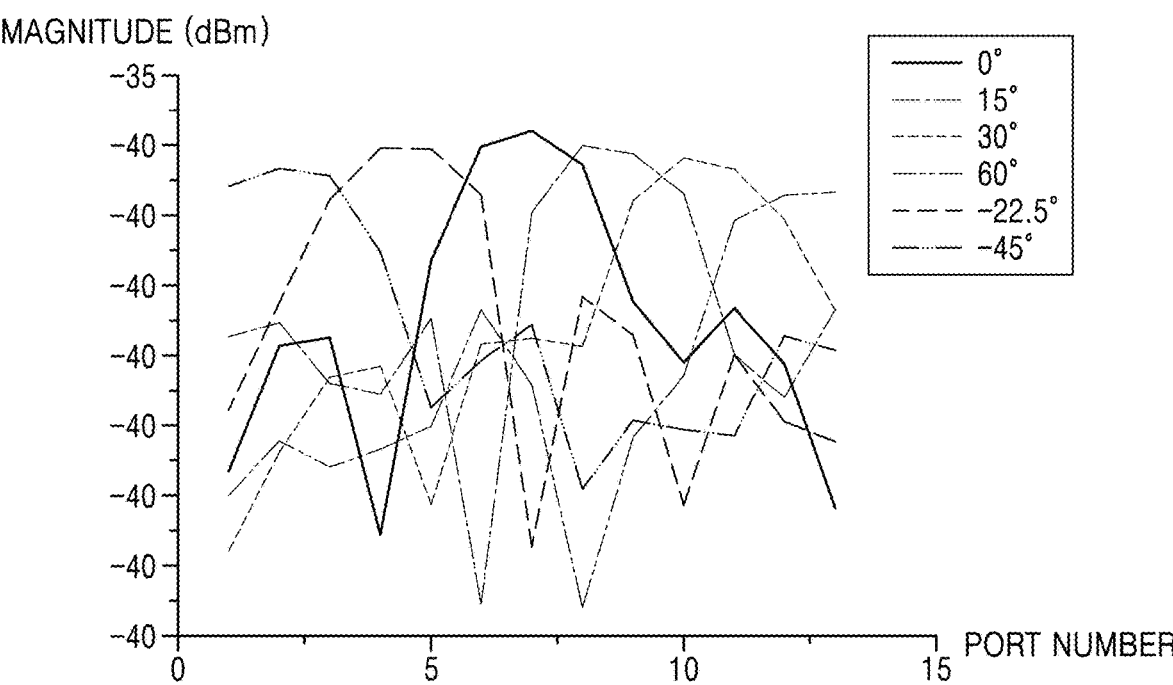
FIG. 7 is a graph illustrating a change in the magnitude of a signal for each port number depending on the direction of a signal incident on a reconfigurable intelligent surface according to an embodiment.

FIG. 7 is a graph illustrating a change in the magnitude of a signal for each port number depending on the direction of a signal incident on an RIS 110 according to an embodiment.

The direction of the signal incident on the RIS 110 may be various. For example, the direction of the signal incident on the RIS 110 may change, such as 0 degrees, 15 degrees, 30 degrees, 60 degrees, −22.5 degrees, or −45 degrees. As the direction of the signal incident on the RIS 110 changes, it may have different magnitudes around a particular port among the plurality of ports. For example, the magnitude of a signal incident at 0 degrees may be greatest around port number 7, whereas the magnitude of a signal incident at 15 degrees may be greatest around port number 8.

A plane wave incident on the RIS 110 in a certain direction may be incident on the sampling area 310 of the RIS 110 with different phases depending on the incidence angles. The plane wave incident on the plurality of sampling unit cells 411, 412, 413, and 414 of the sampling area 310 may be transmitted to the multiple input/output circuit 200. Due to the quasi-optical characteristics of the multiple input/output circuit 200, a strong signal intensity may appear around a particular output port of the multiple input/output circuit 200.

The processor 120 may obtain a signal intensity value around a particular output port of the multiple input/output circuit 200. The processor 120 may plot the signal intensity value around a particular output port of the multiple input/output circuit 200. The processor 120 may approximate the plotted graph to a parabola with a negative curvature. The processor 120 may estimate the incidence direction of the signal based on the maximum value point of the graph approximated to the parabola.

Figure 8:
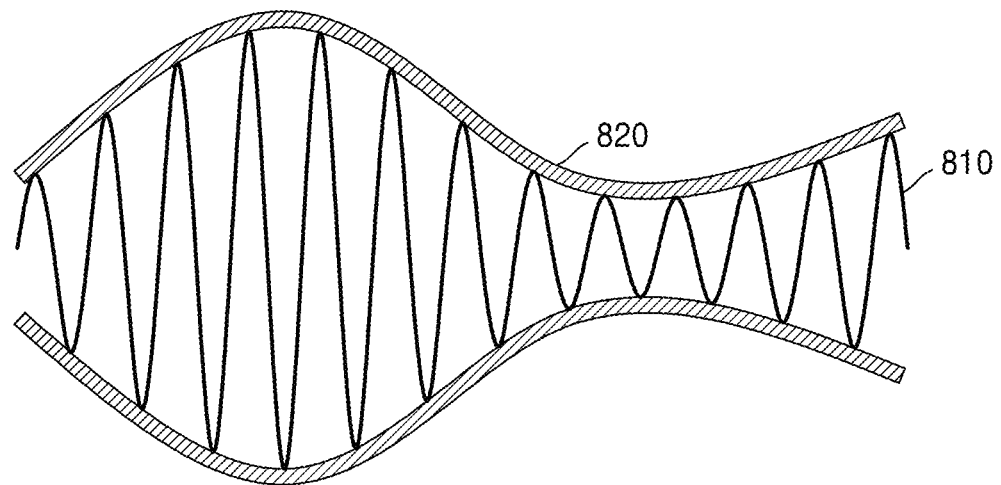
FIG. 8 is a graph illustrating the detection result of a magnitude detection circuit of a signal detection circuit according to an embodiment.

FIG. 8 is a graph illustrating the detection result of a magnitude detection circuit 330 of a signal detection circuit according to an embodiment.

The magnitude detection circuit 330 may receive an output signal 810 from an output port of the multiple input/output circuit 200. The magnitude detection circuit 330 may obtain an envelope waveform 820 of the output signal 810. The magnitude detection circuit 330 may generate the output signal 810 as an analog output voltage based on the envelope waveform 820.

Figure 9:
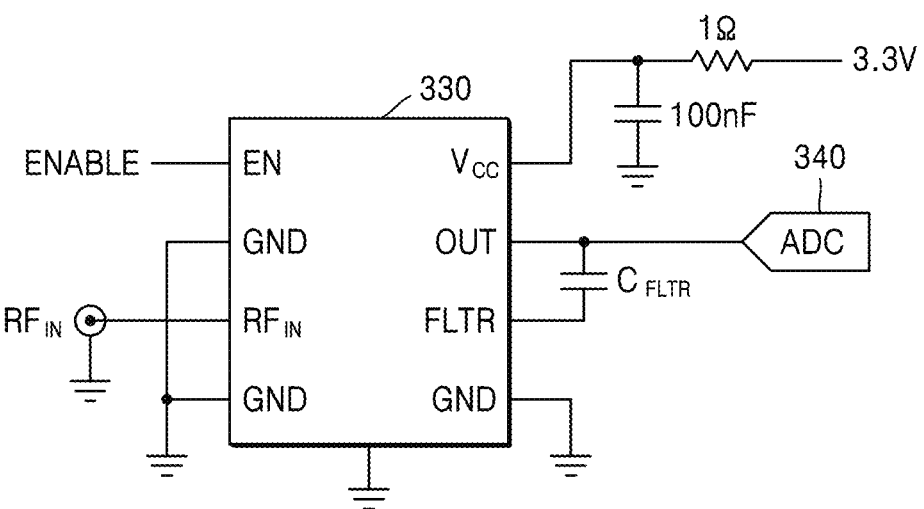
FIG. 9 is a diagram illustrating a magnitude detection circuit and an analog-to-digital converter (ADC) according to an embodiment.

FIG. 9 is a diagram illustrating a magnitude detection circuit and an ADC 340 according to an embodiment. The magnitude detection circuit 330 according to an embodiment may be an envelope detector or a power detector. The magnitude detection circuit 330 according to an embodiment may be implemented as a chip including a plurality of input/output terminals. The magnitude detection circuit 330 may be electrically connected to the ADC 340.

The magnitude detection circuit 330 may receive an RF input signal. The magnitude detection circuit 330 may receive a Vcc power voltage. The magnitude detection circuit 330 may operate by receiving an enable (ENABLE) signal. The magnitude detection circuit 330 may detect the envelope of a signal in the chip. The magnitude detection circuit 330 may transmit the output generated as a result of the detection to the ADC 340 through a filter port.

The ADC 340 may convert the output received from the magnitude detection circuit 330 and transmit the result thereof to the processor 120. Accordingly, a signal including a low-frequency component may be transmitted to the processor 120. The signal transmitted to the processor 120 may correspond to the power output from the plurality of output ports included in the multiple input/output circuit 200. The processor 120 may estimate the direction of the signal incident on the RIS 110 by using parabola curve fitting based on the output received from the ADC 340. The processor 120 may control the direction in which the plurality of reflection unit cells 511, 512, 513, and 514 reflect the signal, based on the estimated direction of the incident signal.

Figure 10:
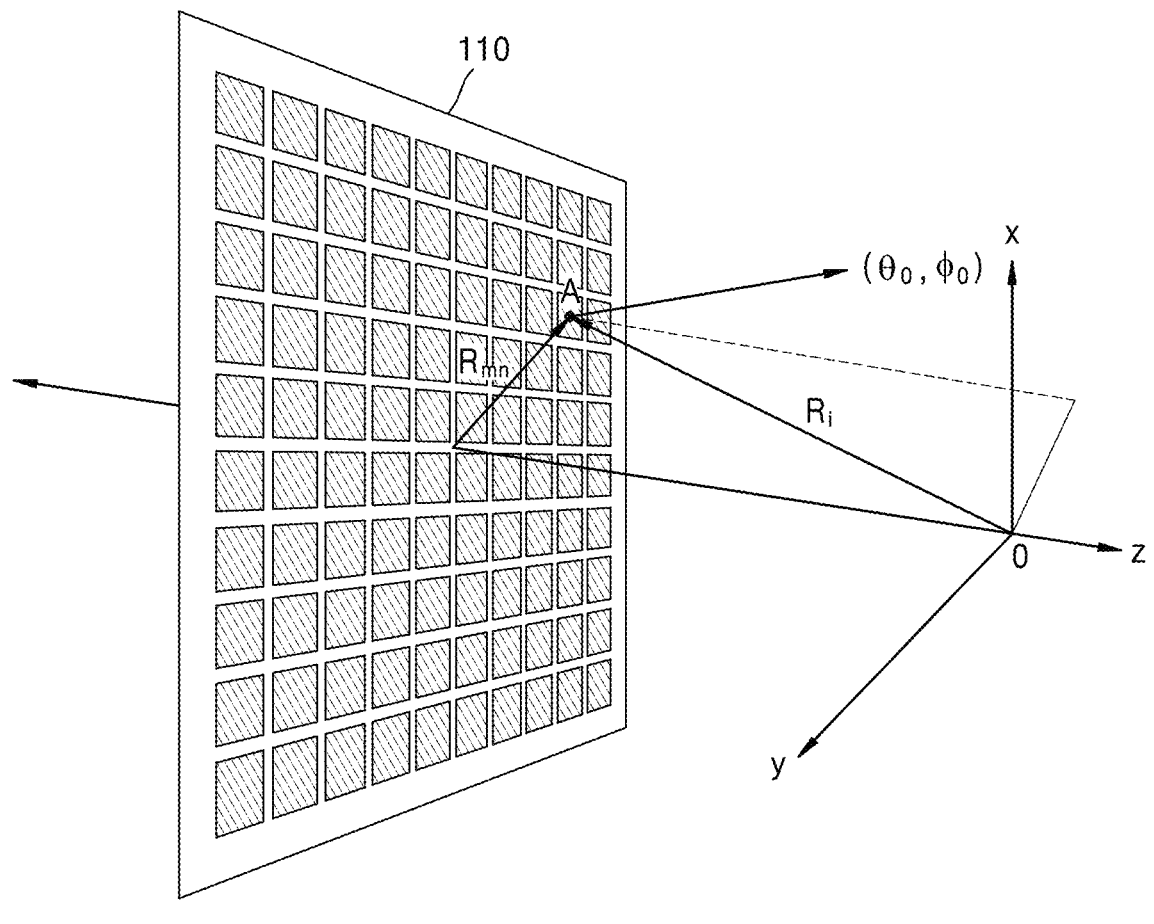
FIG. 10 is a diagram illustrating a reconfigurable intelligent surface measuring a distance to a base station according to an embodiment.

FIG. 10 is a diagram illustrating a reconfigurable intelligent surface 110 measuring a distance to a base station according to an embodiment. FIG. 10 illustrates measuring the distance from the RIS 110 to the base station assuming that an antenna of the base station is located at an origin O.

The phase arrangement of the plurality of reflection unit cells 511, 512, 513, and 514 arranged on the RIS 110 may be set to satisfy an equation according to a beam synthesis of a reflection array. Because the distance to the base station is generally great, a direction vector from the RIS 110 to the base station may be first calculated before measuring the distance to the base station. When it is not easy to measure the actual distance to the base station, the distance to the base station may be estimated based on the maximum distance at which the user may be present and the detected direction information, with reference to the indoor size.

The distance from the RIS 110 to the base station may be mathematically calculated based on the distance vector from the user to the base station observed indoors, the direction unit vector from the user to the base station observed indoors, the distance vector from the center of the RIS 110 to the reflection unit cell, the phase of a radio wave reflected at the reflection unit cell, and the wave number thereof.

Figure 11:
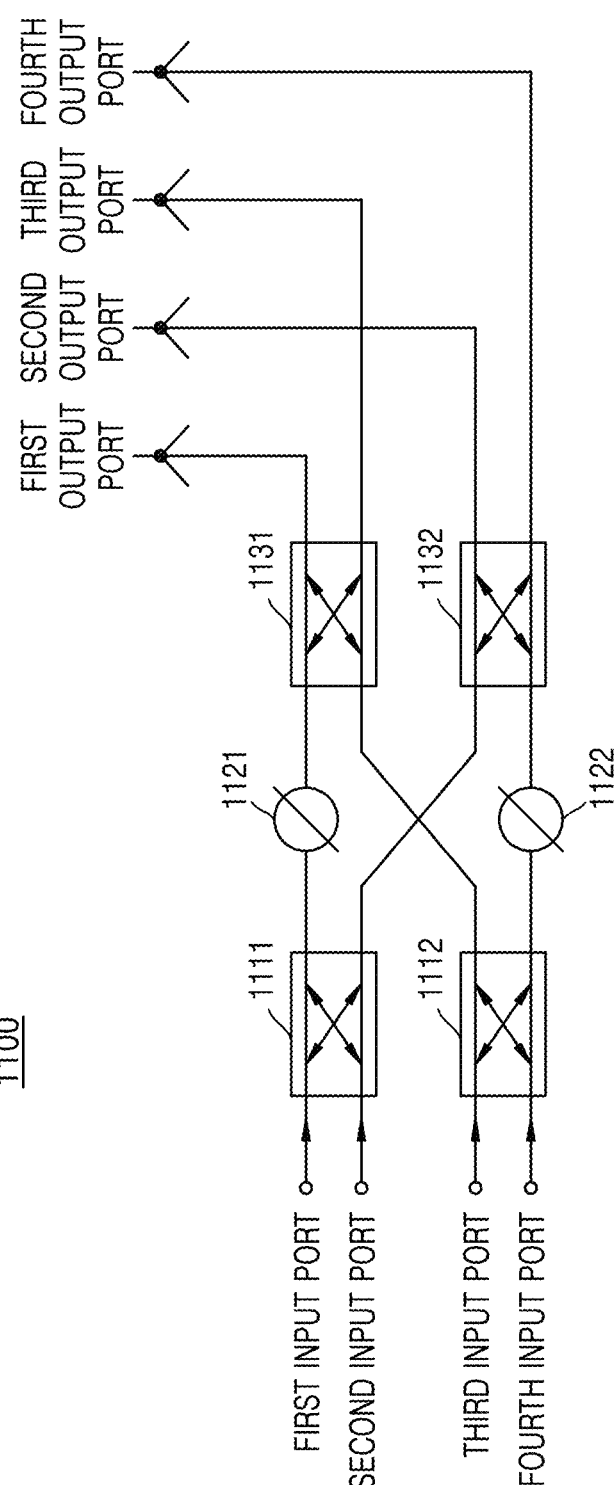
FIG. 11 is a diagram illustrating a multiple input/output circuit according to an embodiment.

FIG. 11 is a diagram illustrating a multiple input/output circuit 1100 according to an embodiment. As described above with reference to FIG. 2, the structure capable of implementing the multiple input/output circuit is not limited to a Rotman lens. That is, it may be implemented by using a circuit that includes a plurality of input ports and a plurality of output ports and whose output varies depending on the input ports. For example, the multiple input/output circuit 1100 may be implemented based on a circuit having a beamforming structure. FIG. 11 is a diagram illustrating the multiple input/output circuit 1100 implemented in a Butler matrix structure. The Butler matrix structure may be a circuit in which the phase of the output port may vary depending on the input port.

The multiple input/output circuit 1100 according to an embodiment may include a plurality of power distribution circuits 1111, 1112, 1131, and 1132 and a plurality of phase shifters 1121 and 1122. The plurality of power distribution circuits 1111, 1112, 1131, and 1132 may include a first power distribution circuit 1111, a second power distribution circuit 1112, a third power distribution circuit 1131, and a fourth power distribution circuit 1132. The plurality of phase shifters 1121 and 1122 may include a first phase shifter 1121 and a second phase shifter 1122.

The first power distribution circuit 1111 may receive a signal from at least one of the first input port and the second input port. The first power distribution circuit 1111 may output a signal to the first phase shifter 1121 and the fourth power distribution circuit 1132. The first power distribution circuit 1111 may reduce the magnitude of the signal received from one input port by −3 dB and distribute and output the result thereof to the first phase shifter 1121 and the fourth power distribution circuit 1132.

The second power distribution circuit 1112 may receive a signal from at least one of the third input port and the fourth input port. The second power distribution circuit 1112 may output signals to the second phase shifter 1122 and the third power distribution circuit 1131. The second power distribution circuit 1112 may reduce the magnitude of the signal received from one input port by −3 dB and distribute and output the result thereof to the second phase shifter 1122 and the third power distribution circuit 1131.

The first phase shifter 1121 may receive a signal from the first power distribution circuit 1111. The first phase shifter 1121 may change the phase of the received signal by −45 degrees. The first phase shifter 1121 may output the phase-changed signal to the third power distribution circuit 1131.

The second phase shifter 1122 may receive a signal from the second power distribution circuit 1112. The second phase shifter 1122 may change the phase of the received signal by −45 degrees. The second phase shifter 1122 may output the phase-changed signal to the fourth power distribution circuit 1132.

The third power distribution circuit 1131 may receive a signal from at least one of the first phase shifter 1121 and the second power distribution circuit 1112. The third power distribution circuit 1131 may output signals to the first output port and the second output port. The third power distribution circuit 1131 may reduce the magnitude of the signal received from one input terminal by −3 dB and distribute and output the result thereof to the first output port and the second output port.

The fourth power distribution circuit 1132 may receive a signal from at least one of the second phase shifter 1122 and the first power distribution circuit 1111. The fourth power distribution circuit 1132 may output signals to the third output port and the fourth output port. The fourth power distribution circuit 1132 may reduce the magnitude of the signal received from one input terminal by −3 dB and distribute and output the result thereof to the third output port and the fourth output port.

Figure 12:
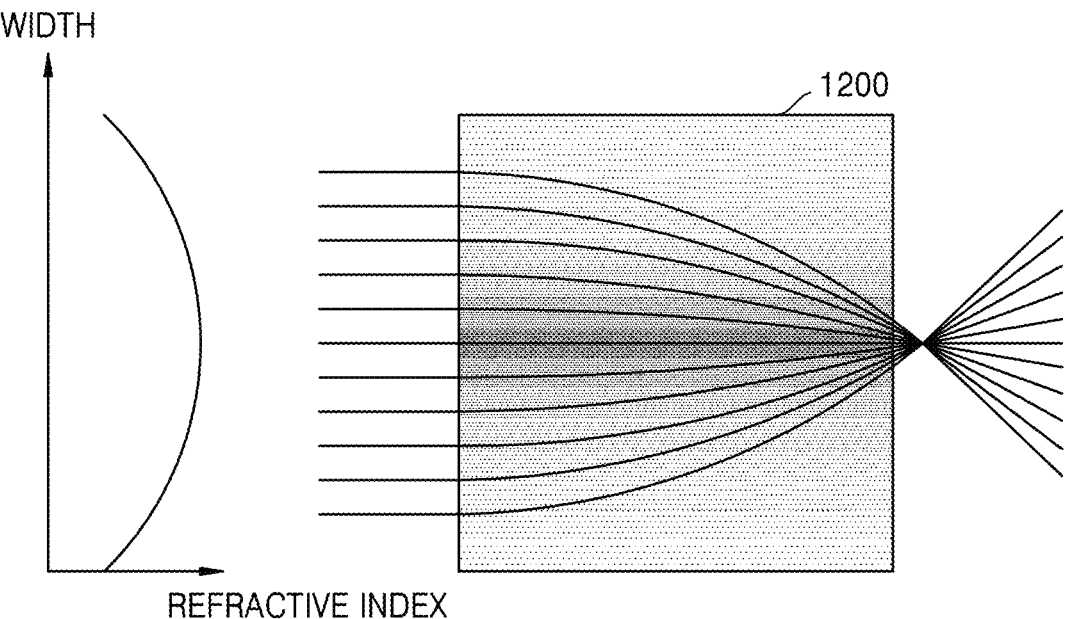
FIG. 12 is a diagram illustrating a multiple input/output circuit according to an embodiment.

FIG. 12 is a diagram illustrating a multiple input/output circuit 1200 according to an embodiment. FIG. 12 is a diagram illustrating that the multiple input/output circuit 1200 is implemented in a gradient index lens structure. A gradient index lens may be a lens in which the phase of the output port may vary depending on the input port.

A gradient index lens may be a lens that changes a beam by adjusting a refractive index depending on the position through which an electromagnetic wave passes. In the multiple input/output circuit 1200 using a gradient index lens, the refractive index of an electromagnetic wave may increase toward the center portion adjacent to the signal propagation path. In the multiple input/output circuit 1200 using a gradient index lens, the refractive index of an electromagnetic wave may decrease toward the edge spaced apart from the signal propagation path. In the multiple input/output circuit 1200 using a gradient index lens, a signal may be concentrated and then distributed at a point where the signal is output.

The gradient index lens may be applied to the multiple input/output circuit 1200 having a three-dimensional structure. The gradient index lens may have advantages in terms of design freedom and manufacturing difficulty, compared to a lens including a single material.

Figure 13:
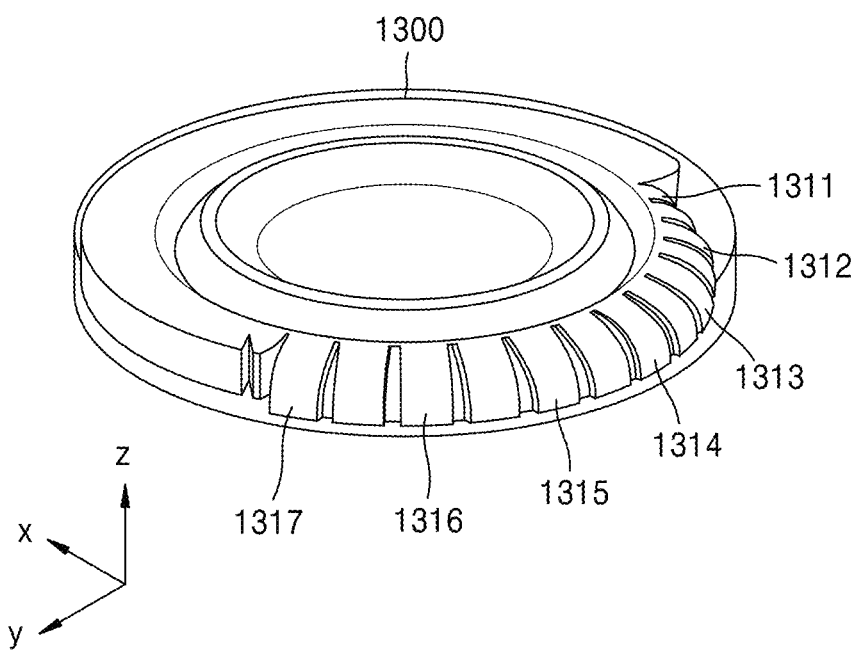
FIG. 13 is a diagram illustrating a multiple input/output circuit according to an embodiment.

FIG. 13 is a diagram illustrating a multiple input/output circuit 1300 according to an embodiment. FIG. 13 is a diagram illustrating that the multiple input/output circuit 1300 is implemented in a geodesic lens structure. A geodesic lens may be a lens in which the phase of the output port may vary depending on the input port.

The multiple input/output circuit 1300 may include a first port 1311, a second port 1312, a third port 1313, a fourth port 1314, a fifth port 1315, a sixth port 1316, and a seventh port 1317. The magnitude and phase of the output may vary depending on through which of the first port 1311 to the seventh port 1317 a signal is input. Also, the magnitude and phase of the output may vary depending on the phase of a signal input to at least one of the first port 1311 to the seventh port 1317.

The geodesic lens may be a lens that implements beam-forming of electromagnetic waves beyond a metal conductor. The direction of the output of the geodesic lens may vary depending on the position of a source due to a difference in the refractive index. In the geodesic lens, the maximum power position of an input port may vary depending on the incidence angle of a received radio wave.

Figure 14:
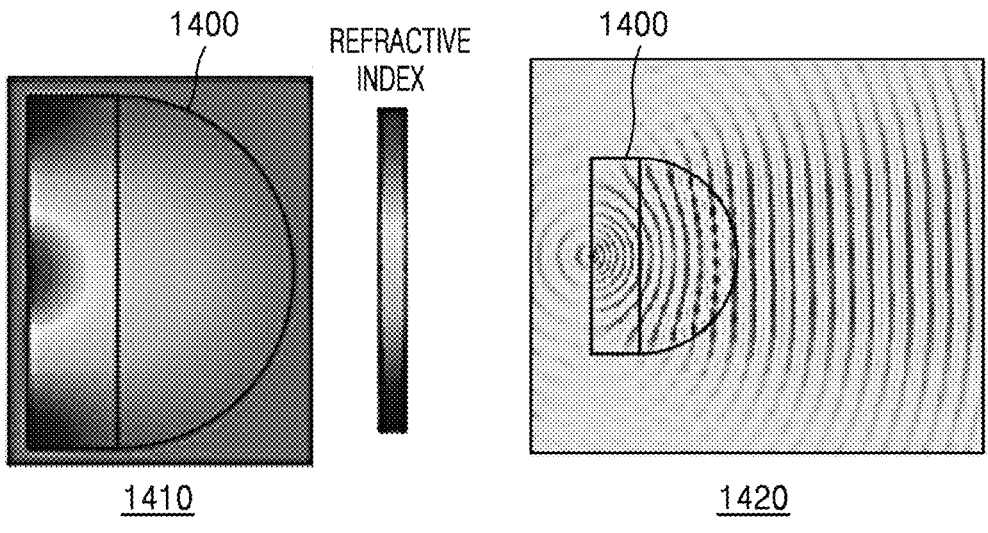
FIG. 14 is a diagram illustrating a multiple input/output circuit according to an embodiment.

FIG. 14 is a diagram illustrating a multiple input/output circuit 1400 according to an embodiment. FIG. 14 is a diagram illustrating that the multiple input/output circuit 1400 is implemented in a Luneburg lens structure. A Luneburg lens may be a lens in which the phase of the output port may vary depending on the input port.

As may be seen from a first structure 1410, the multiple input/output circuit 1400 may have a refractive index that varies gradually depending on the internal position. For example, the refractive index may increase toward the inner center of the multiple input/output circuit 1400.

As may be seen from a second structure 1420, the multiple input/output circuit 1400 may vary the magnitude and phase of an output signal depending on the direction of an incident signal. Also, the multiple input/output circuit 1400 may vary the magnitude and phase of an output signal depending on the phase of an incident signal.

The Luneburg lens may be a lens that implements beam-forming of electromagnetic waves beyond a metal conductor. The direction of the output of the Luneburg lens may vary depending on the position of a source due to a difference in the refractive index. In the Luneburg lens, the maximum power position of an input port may vary depending on the incidence angle of a received radio wave.

Figure 15:
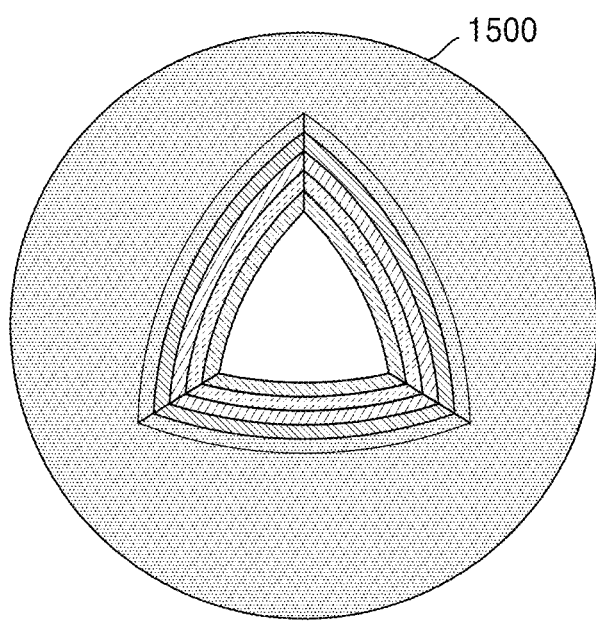
FIG. 15 is a diagram illustrating a multiple input/output circuit according to an embodiment.

FIG. 15 is a diagram illustrating a multiple input/output circuit 1500 according to an embodiment. FIG. 15 is a diagram illustrating that the multiple input/output circuit 1500 is implemented in a Luneburg lens structure. In FIG. 15, a structure for tracking a direction of arrival (DoA) is implemented by implementing a Luneberg lens in a three-dimensional form. The multiple input/output circuit 1500 may include a spherical Luneberg lens. The multiple input/output circuit 1500 may have a refractive index that increases toward the inner center. In FIG. 15, a structure for three-dimensionally estimating the DoA without fixing a power feeder (or a feeding part) is implemented.

Figure 16:
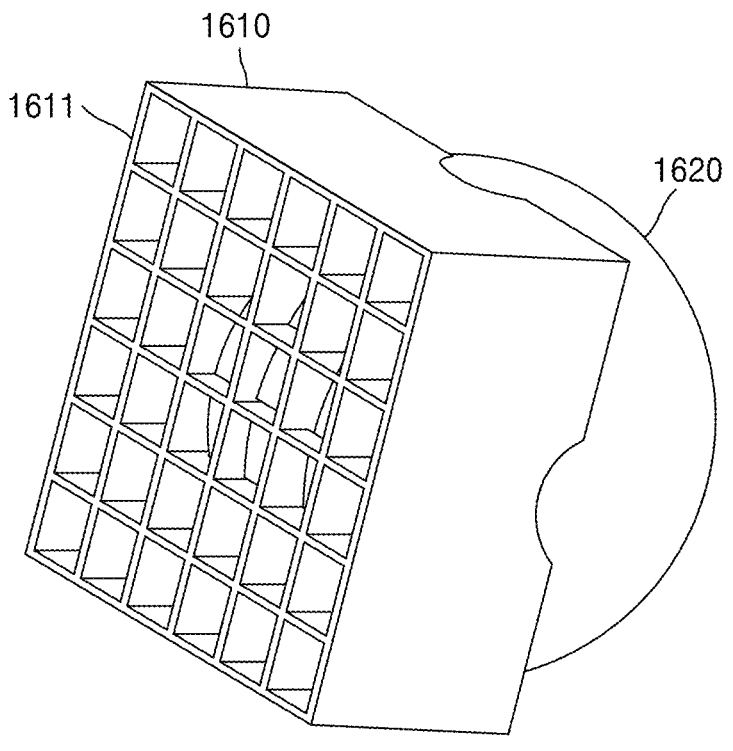
FIG. 16 is a diagram illustrating a multiple input/output circuit according to an embodiment.

FIG. 16 is a diagram illustrating a multiple input/output circuit 1620 according to an embodiment. FIG. 16 is a diagram illustrating that the multiple input/output circuit 1620 is implemented in a Luneburg lens structure. In FIG. 16, a structure for tracking a DoA is implemented by implementing a Luneberg lens in a form in which a two-dimensional for and a three-dimensional form are combined with each other. The multiple input/output circuit 1620 may include a hemispherical Luneberg lens. A power feeder 1610 may be coupled to the multiple input/output circuit 1620. The power feeder 1610 may include a plurality of waveguide arrays 1611. When a two-dimensional power feeder 1610 is coupled to a hemispherical Luneberg lens, it may be possible to detect at which position of the waveguide array 1611 the maximum power is received depending on the incidence angle. In FIG. 16, a structure for two-dimensionally estimating the DoA in a hemispheric area is implemented by coupling the power feeder 1610 thereto.

FIG. 17 is a diagram illustrating a detection method using a signal detection circuit according to an embodiment.

In operation 1710, the signal detection circuit according to an embodiment may receive an incident signal through a plurality of sampling cells.

In operation 1720, the signal detection circuit according to an embodiment may transmit signals received by the plurality of sampling cells to a multiple input/output circuit.

In operation 1730, the signal detection circuit according to an embodiment may process the transmitted signal through the multiple input/output circuit.

In operation 1740, the signal detection circuit according to an embodiment may transmit the signal processed by the multiple input/output circuit to the magnitude detection circuit.

In operation 1750, the signal detection circuit according to an embodiment may identify the incidence direction of the signal by detecting the magnitude of the signal through the magnitude detection circuit.

Figure 18:
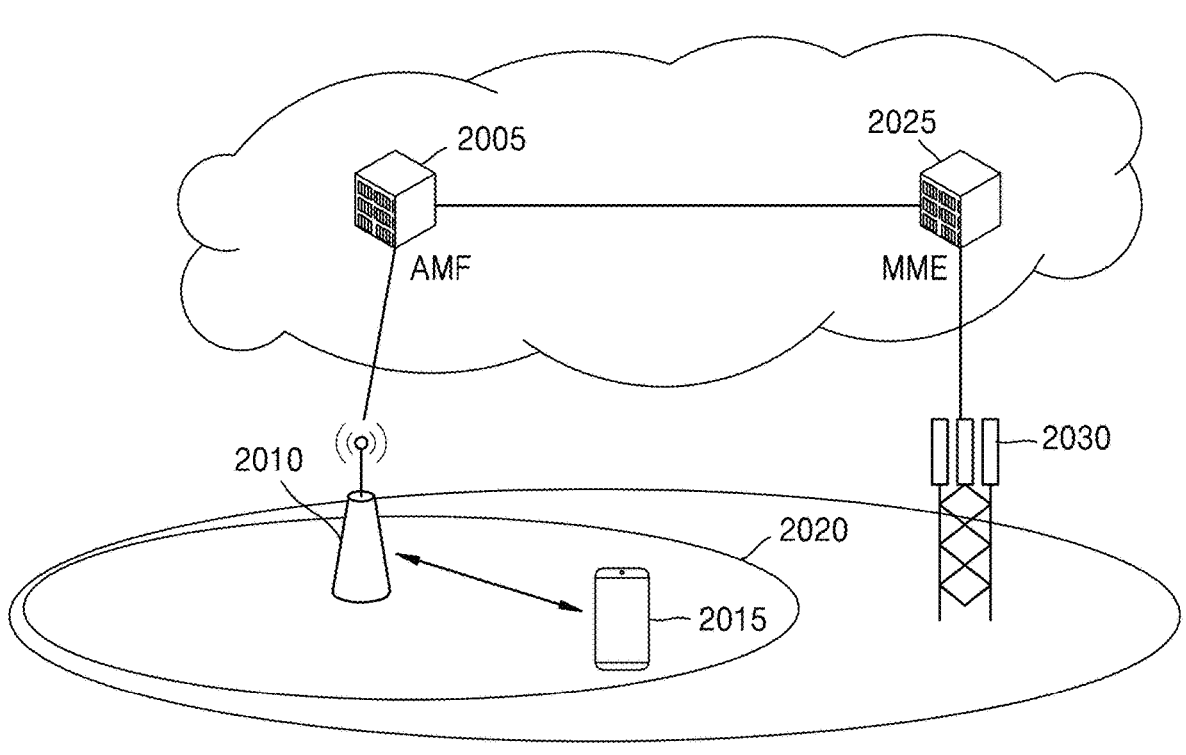
FIG. 18 is a diagram illustrating a communication system to which a reconfigurable intelligent surface is applied according to an embodiment.

FIG. 18 is a diagram illustrating a communication system to which an RIS 110 is applied according to an embodiment. For example, the communication system illustrated in FIG. 18 may be a 5G communication system. However, the disclosure is not limited thereto, and the description of the communication system given with reference to FIG. 18 may also be applied to next-generation communication systems after 5G communication systems, that is, to 6G communication systems. The communication system may include a network device (e.g., an access and mobility function (AMF)) 2005, a first base station 2010, a user terminal 2015, a mobility management entity (MME) 2025, and a second base station 2030.

The network device 2005 may be connected to the first base station 2010 and the mobility management entity 2025. The network device 2005 may connect the user terminal 2015 to the network of the communication system. The network device 2005 may manage various control functions of the user terminal 2015. The network device 2005 may allow the user terminal 2015 to access the network. The network device 2005 may support a mobility function of the user terminal 2015. The mobility function may be a function for allowing the user terminal 2015 to freely move from a cell area 2020 to another cell area. The network device 2005 may support a Quality of Service (QOS) setting function of the user terminal 2015. Based on the current resources, the network device 2005 may determine the priority of information to be transmitted when transmitting data of the user terminal 2015 and ensure a designated level during data transmission.

The first base station 2010 may be connected to the network device 2005 and the user terminal 2015. The first base station 2010 may generate the cell area 2020. The first base station 2010 may connect the user terminal 2015 in the cell area 2020 to the network. The first base station 2010 may establish a channel for the user terminal 2015 to wirelessly access the network. The first base station 2010 may control data transmission/reception of the user terminal 2015 based on status information including available resources of the user terminal 2015 and an environment of the established channel.

The mobility management entity 2025 may be connected to the network device 2005 and the second base station 2030. The mobility management entity 2025 may support a bearer setting function of the user terminal 2015. By setting a bearer, it may be possible to define how to process data of the user terminal 2015 when passing through the network.

The second base station 2030 may be connected to the mobility management entity 2025. The second base station 2030 may provide a data bearer under the control by the mobility management entity 2025.

Figure 19:
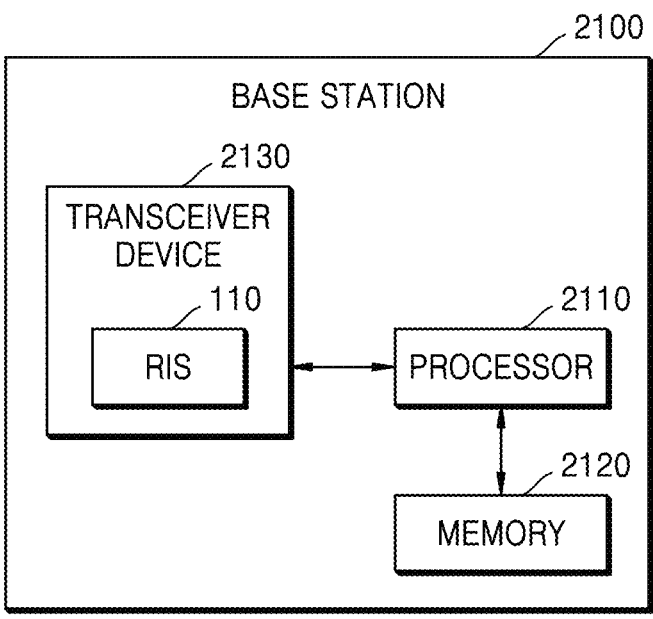
FIG. 19 is a block diagram of a base station according to an embodiment.

FIG. 19 is a block diagram of a base station 2100 according to an embodiment. The base station 2100 according to an embodiment may correspond to the first base station 2010 described with reference to FIG. 20. That is, the base station 2100 according to an embodiment may be a device that connects the user terminal 2115 to the network of the communication system and controls data transmission/reception of the user terminal 2015. The base station 2100 may include a processor 2110, a memory 2120, and a transceiver device 2130.

The processor 2110 may control overall operations of the base station 2100. The processor 2110 may perform protocol stack functions required by the communication standards. The processor 2110 may perform baseband processing of transmitted/received signals and a backhaul communication function. The baseband processing may refer to a processing process for converting digital data into an RF signal in order to transmit signals through a radio access network (RAN). The backhaul communication function may be a function for transmitting a signal from a remote position to another position. The processor 2110 may store data in the memory 2120. The processor 2110 may load the data stored in the memory 2120.

By executing a program stored in the memory 2120, the processor 2110 may determine a channel type through which at least one piece of uplink control information is to be transmitted. The processor 2110 may provide setting information based on the determination result to a terminal and control the transceiver device 2130 to receive at least one piece of uplink control information based on the setting information. The processor 2110 may transmit setting information about whether to simultaneously transmit an uplink control channel and an uplink data channel and may control the transceiver device 2130 to transmit scheduling information about at least one of at least one uplink control channel and at least one uplink data channel.

The memory 2120 may store at least one program including a basic program, an application program, and a setting program for operation of the base station 2100. The memory 2120 may store at least one piece of terminal information including information about the bearer allocated to a terminal connected to the base station 2100 and measurement results reported from the connected terminal. The memory 2120 may store determination information as a criterion for determining whether to provide a multiple connection to the terminal or to stop providing the multiple connection. The memory 2120 may store data according to a storage request of the processor 2110. The memory 2120 may provide the stored data to the processor 2110 according to a load request of the processor 2110.

The transceiver device 2130 may transmit/receive signals to/from the terminal through a wireless channel. The transceiver device 2130 may perform a conversion function between a baseband signal and digital data according to the physical layer standards of the communication system. When transmitting data, the transceiver device 2130 may encode and modulate data to be transmitted. When receiving data, the transceiver device 2130 may demodulate and decode a baseband signal. The transceiver device 2130 may upconvert a baseband signal into an RF band signal and then transmit the same through an antenna. The transceiver device 2130 may downconvert an RF band signal received through the antenna into a baseband signal.

Transceiver device 2130 may include an RIS 110. The RIS 110 may set a channel environment for the transceiver device 2130 to transmit or receive a signal. The RIS 110 may set a beam generated by the transceiver device 2130 to establish a channel. The RIS 110 may adjust the direction of a beam for the transceiver device 2130 to transmit or receive a signal.

Figure 20:
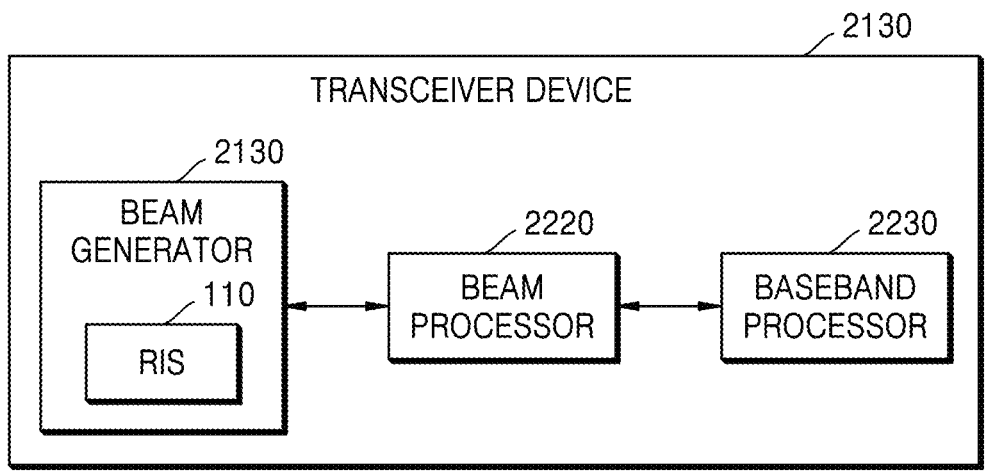
FIG. 20 is a block diagram of a transceiver device according to an embodiment.

FIG. 20 is a block diagram of a transceiver device 2130 according to an embodiment. The transceiver device 2130 according to an embodiment may include a beam generator 2210, an RF processor 2220, and a baseband processor 2230.

The beam generator 2210 may transmit/receive signals. The beam generator 2210 may include an antenna for transmitting/receiving signals. The beam generator 2210 may generate a beam for transmitting/receiving signals. The beam generator 2210 may perform beamforming. The beam generator 2210 may include an RIS 110. The RIS 110 may set a beam generated by the beam generator 2210. The RIS 110 may adjust the direction of a beam generated by the beam generator 2210.

The RF processor 2220 may perform functions for transmitting/receiving a signal through a wireless channel, such as a signal band conversion function and a signal amplification function. The RF processor 2220 may upconvert a baseband signal into an RF band signal. The RF processor 2220 may transmit an RF band signal through the beam generator 2210. The RF processor 2220 may downconvert an RF band signal received through the beam generator 2210 into a baseband signal.

The baseband processor 2230 may perform a conversion function between a baseband signal and digital data according to the physical layer standards of the set radio access technology. When transmitting data, the baseband processor 2230 may encode and modulate digital data to be transmitted. When receiving data, the baseband processor 2230 may convert a baseband signal received from the RF processor 2220 into digital data through demodulation and decoding.

The disclosure is intended to reduce the manufacturing cost of the signal detection circuit by reducing the number of RF elements required in the signal detection circuit with hardware using the multiple input/output circuit.

The disclosure may reduce the number of RF elements required in the signal detection circuit by detecting the incidence direction of a signal by using the multiple input/output circuit and the magnitude detection circuit. Accordingly, the disclosure may reduce the manufacturing cost of the signal detection circuit.

The plurality of unit cells of the RIS according to an embodiment may include a via wall structure. Accordingly, the RIS according to an embodiment may more accurately estimate the position of the transmitter by reducing the phase distortion of received radio waves by reducing the influence between the plurality of unit cells.

The method according to an embodiment may be embodied in the form of program commands executable through various computer means, which may be recorded on a computer-readable recording medium. The computer-readable recording medium may include program instructions, data files, and data structures either alone or in combination. The program commands recorded on the computer-readable recording medium may be those that are especially designed and configured for the disclosure, or may be those that are known and available to computer programmers skilled in the art. Examples of the computer-readable recording medium include magnetic media such as hard disks, floppy disks, and magnetic tapes, optical media such as CD-ROMs and DVDs, magneto-optical media such as floptical disks, and hardware devices such as ROMs, RAMs, and flash memories that are specially configured to store and execute program instructions. Examples of the program commands include not only machine language codes such as those generated by compilers, but also high-level language codes that may be executed by computers by using interpreters or the like.

Some embodiments may also be implemented in the form of computer-readable recording mediums including instructions executable by computers, such as program modules executed by computers. The computer-readable recording mediums may be any available mediums accessible by computers and may include volatile or nonvolatile mediums and removable or nonremovable mediums. Also, the computer-readable recording mediums may include computer storage mediums and communication mediums. The computer storage mediums may include volatile or nonvolatile mediums and removable or nonremovable mediums implemented by any method or technology for storing information such as computer-readable instructions, data structures, program modules, or other data. The communication mediums may include any information transmission medium and may include other transmission mechanisms or other data of modulated data signals such as carrier waves, computer-readable instructions, data structures, or program modules. Also, some embodiments may be implemented by a computer program or computer program product including instructions executable by a computer, such as a computer program executed by a computer.

The machine-readable storage medium may be provided in the form of a non-transitory storage medium. Here, the term "non-transitory storage medium" may mean that the storage medium is a tangible device and does not include signals (e.g., electromagnetic waves), and may mean that data may be permanently or temporarily stored in the storage medium. For example, the 'non-transitory storage medium' may include a buffer in which data is temporarily stored.

According to an embodiment, the method according to various embodiments described herein may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store or directly between two user devices (e.g., smartphones). In the case of online distribution, at least a portion of the computer program product (e.g., a downloadable app) may be at least temporarily stored or temporarily generated in a storage medium readable by a machine such as a manufacturer's server, a server of an application store, or a memory of a relay server.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A signal detection circuit comprising:
a reconfigurable intelligent surface;
a multiple input/output circuit connected to the reconfigurable intelligent surface;
a magnitude detection circuit connected to the multiple input/output circuit; and
a processor connected to the magnitude detection circuit,
wherein the reconfigurable intelligent surface comprises a
sampling area arranged to intersect in a first direction
and a second direction and a reflection area arranged in
an area other than the sampling area, the multiple input/output circuit is configured to receive and process a signal from the sampling area, the magnitude detection circuit is configured to receive the signal from the multiple input/output circuit and detect a magnitude of the received signal, and the processor is configured to identify an incidence direction of the signal based on a detection result of the magnitude detection circuit.

2. The signal detection circuit of claim 1, wherein the sampling area comprises a plurality of sampling unit cells arranged in parallel.

3. The signal detection circuit of claim 2, wherein a transmission coefficient when a signal is transmitted from the plurality of sampling unit cells to the multiple input/output circuit is designed to be adjacent to 0 dB.

4. The signal detection circuit of claim 1, wherein the multiple input/output circuit comprises:

a plurality of input ports;

a plurality of output ports; and a waveguide structure arranged between the plurality of input ports and the plurality of output ports.

5. The signal detection circuit of claim 1, wherein the multiple input/output circuit comprises a Rotman lens whose output varies depending on an input port.

6. The signal detection circuit of claim 1, wherein the multiple input/output circuit comprises a Butler matrix structure.

7. The signal detection circuit of claim 1, wherein the multiple input/output circuit comprises a gradient index lens structure.

8. The signal detection circuit of claim 1, wherein the multiple input/output circuit comprises a geodesic lens structure.

9. The signal detection circuit of claim 1, wherein the magnitude detection circuit comprises an envelope detector configured to detect an envelope of the received signal.

10. A detection method using a signal detection circuit, the detection method comprising:

receiving an incident signal through a plurality of sampling cells;

transmitting the incident signal received by the plurality of sampling cells to a multiple input/output circuit;

processing the transmitted incident signal through the multiple input/output circuit;

transmitting the incident signal processed by the multiple input/output circuit to a magnitude detection circuit; and identifying an incidence direction of the incident signal by detecting a magnitude of the incident signal through the magnitude detection circuit.

* * * * *